July 8, 1958 R. M. WILMOTTE ET AL 2,842,661
COUNTERS
Original Filed Sept. 26, 1947 2 Sheets-Sheet 1

INVENTORS,
RAYMOND M. WILMOTTE
LARRY L. YOUNG
BY Hyman Hurvitz
Attorney

INVENTORS,
RAYMOND M. WILMOTTE
LARRY L. YOUNG

BY Hyman Hurvitz
attorney

United States Patent Office 2,842,661

Patented July 8, 1958

2,842,661

COUNTERS

Raymond M. Wilmotte, Washington, D. C., and Larry L. Young, Pasadena, Calif., assignors, by direct and mesne assignments, to Padevco Inc., Washington, D. C., a corporation of Delaware Original application September 26, 1947, Serial No. 776,324, now Patent No. 2,646,926, dated July 28, 1953. Divided and this application July 1, 1953, Serial No. 365,496

20 Claims. (Cl. 250—27)

This invention relates to a differential, electronic counter capable of adding and subtracting, selectively in response to signals of alternative character. More particularly the invention relates to such an electronic counter for counting pulses of one type additively and pulses of another type subtractively so as to count the difference between the numbers of two types of pulses.

This application is a division of a copending application of Raymond M. Wilmotte and Larry L. Young, Serial No. 776,324, filed September 26, 1947, and issued on July 28, 1953, as Patent No. 2,646,926. The invention described in this application provides a ring counter capable of counting pulses of one character additively and of another character substantively, and means for connecting a plurality of such reversible ring counters so that they will count units, tens, hundreds, etc. To properly achieve such counting it is necessary for each decade counter to be able to count backwards as well as forwards and that all decade counters after the units counter shall produce a positive count when the preceding counter completes a decade by a 9 to 0 count, and shall produce a negative count when the preceding counter cancels a completed decade by a count from 0 to 9. This objective is achieved by coupling the decade ring circuits by a pulse generating circuit which produces pulses that are counted positively and negatively in a following decade counter in response to the addition or subtraction of a count at the end of a decade in the preceding decade counter.

Accordingly, it is an object of our invention to provide a multiple-decade differential counter which counts certain pulses positively and other pulses negatively.

It is another object of our invention to provide a multiple decade reversible electronic counter which is rapid and reliable.

The invention and the objects thereof will be fully understood from the following description and the drawings in which.

Figures 1, 3:
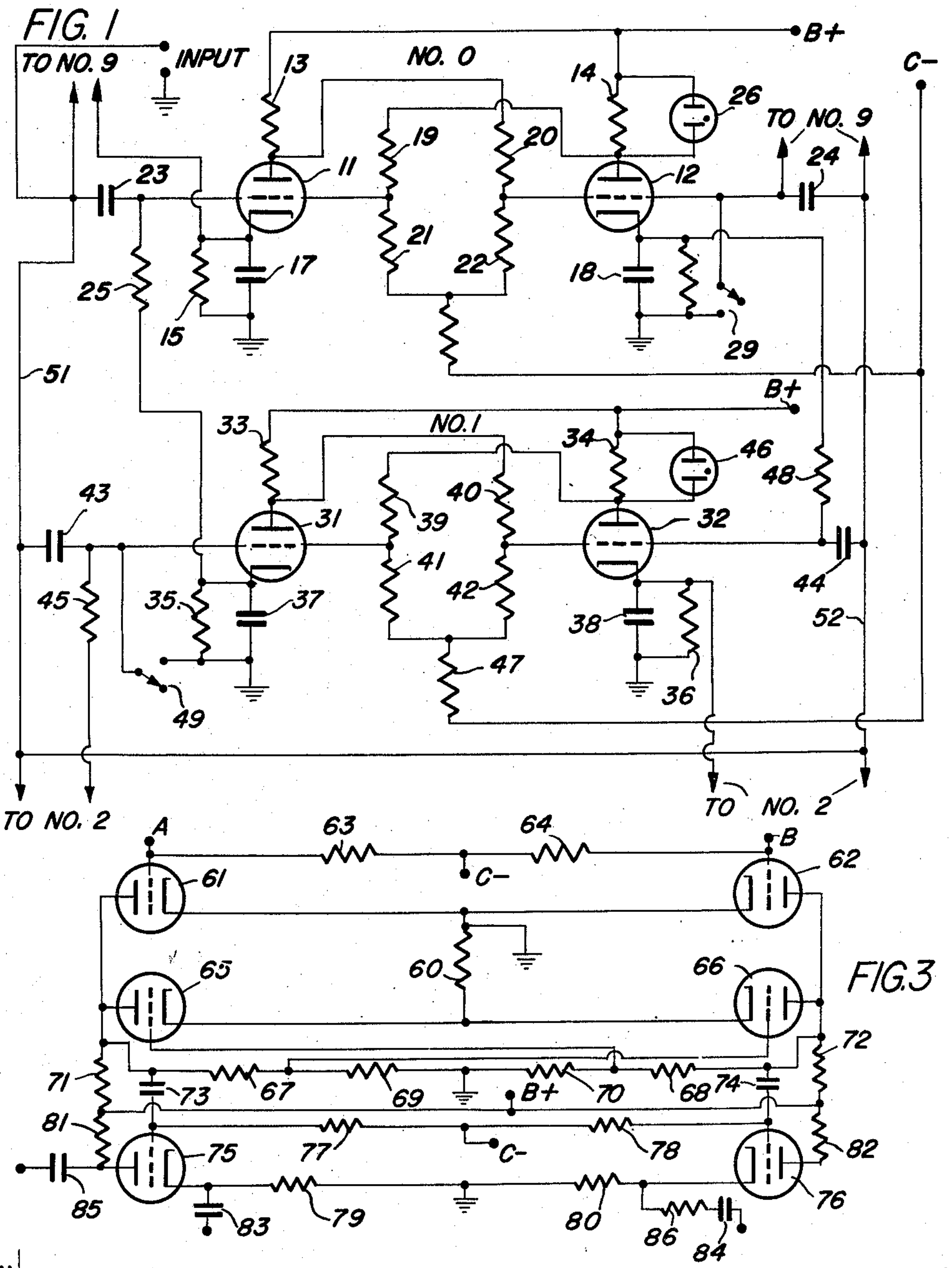
Figure 1 is a diagram showing the circuit and interconnections of the stages of a differential decade circuit.
Figure 3 is a circuit diagram of the coupling circuit.
Figures 2, 5:
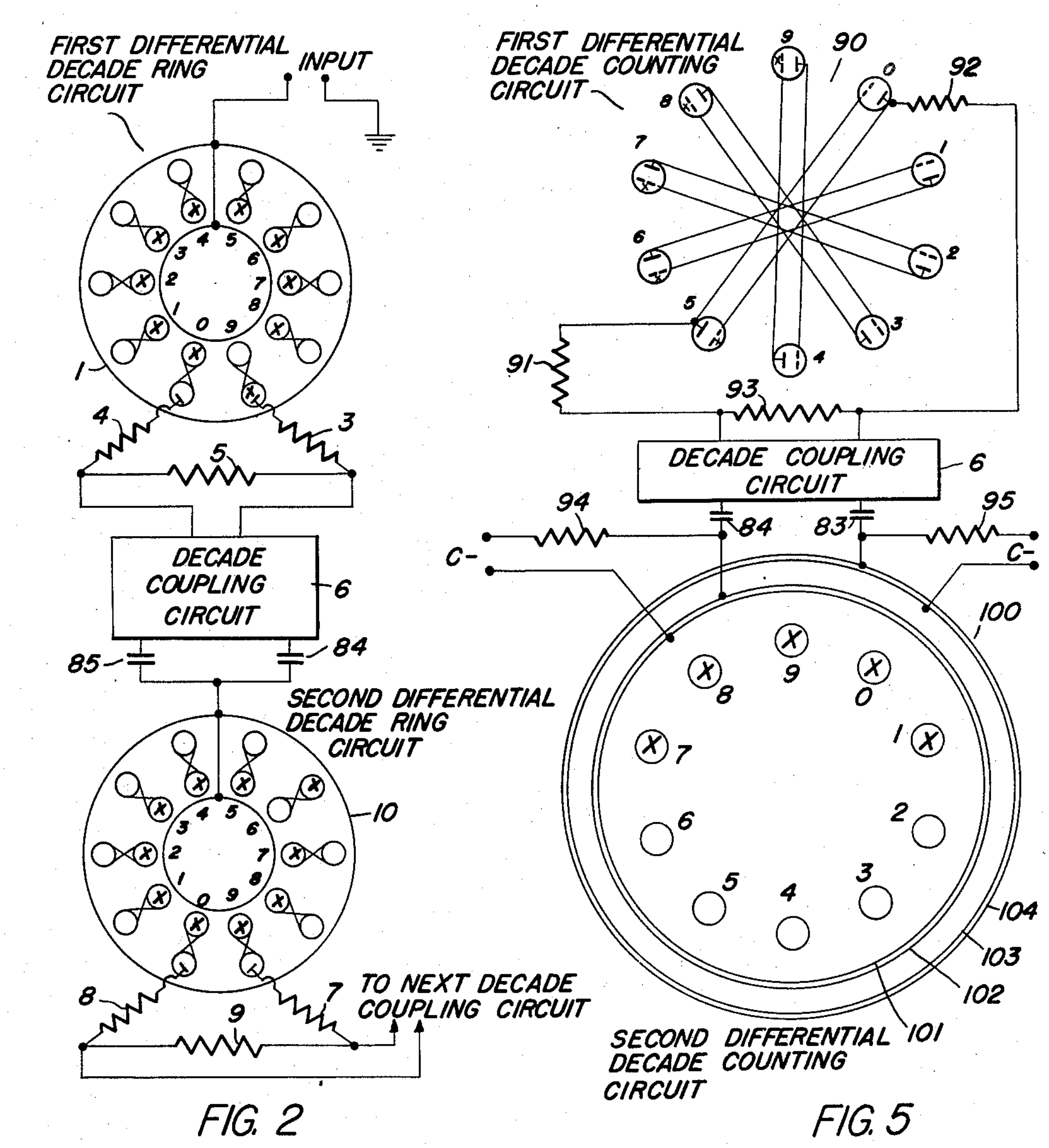
Figure 2 is a block diagram of a multiple decade differential counter.
Figure 5 is a diagram of another differential multiple-decade counter.

Referring to Figure 2, there is shown a differential counter consisting of reversible or differential decade ring circuits 1 and 10. These decade ring circuits will be described hereafter in connection with Figure 1, and are fully described in the co-pending application of Raymond M. Wilmotte entitled, "Differential Electronic Counter." Each of the ten stages of the decade counter consists of an Eccles-Jordan circuit. The ten stages are numbered from 1 to 0. High resistance resistors 3 and 4 are connected to the anodes of the outer tubes of stages 9 and 0, and the other ends of resistors 3 and 4 are connected to terminals A and B. Between terminals A and B is connected another resistor 5. A coupling circuit 6 has its input connected to terminals A and B and its output pulses are impressed on the input of the ring counter 10. In the same manner the anodes of the outer tubes of the 9th and 0 stages of ring circuit 10 are connected through resistors 7, 8, and 9 to other decade coupling circuits and decade ring circuits. Multiple-decade counter having as many decades as desired may thus be provided.

For a complete understanding of the differential ring circuits 1 and 10 in Figure 2, reference is made to Figure 1. In this figure are shown two of the ten stages of the decade counter. Each stage is connected to the preceding and the following stages in the same manner as is shown in Figure 1. The stages shown in Figure 1 may be thought of as being No. 0 and No. 1. Stage No. 0 consists of electron tubes 11 and 12. The anodes of these tubes are connected through resistors 13 and 14 to a source of positive voltage B+. The grids and anodes of tubes 11 and 12 are cross connected through resistors 19 and 20, as shown, to form an Eccles-Jordan circuit. The grids of these tubes are also connected to a source of negative bias voltage C— through resistors 21, 22 and 27. The grids are also connected through condensers 23 and 24 to input terminals upon which are impressed the pulses to be counted.

Stage No. 1 is substantially identical to stage No. 0 described above and consists of a pair of electron tubes 31 and 32 having plate resistors 33 and 34 and cathode resistors 35 and 36, in parallel with condensers 37 and 38. The circuits are also provided with feedback resistors 39 and 40 and grid bias resistors 41 and 42. The resistors 41 and 42 are likewise connected through condensers 43 and 44 to the source of pulses to be counted. The grid of tube 11 is connected through resistor 25 to the cathode of tube 31, that is, to the cathode of the left hand tube of the following stage. The grid of tube 32 is connected to the cathode of tube 12, that is, to the cathode of the corresponding tube of the preceeding stage. The grid of tube 31 will also be connected through resistor 45 to the cathode of the corresponding tube in stage 2 in the same manner that the grid of tube 11 is connected to the cathode of tube 31. Also the grid of tube 12 will be connected to the cathode of the corresponding tube of stage 9 in the same manner that the grid of tube 32 is connected to the cathode of tube 12. It will also be understood that the cathodes of tube 11 will be connected to the corresponding tube of stage 9 in the same manner that the cathode of tube 31 is connected to the grid of tube 11.

In Figure 2 the complete decade ring is shown schematically. The ten stages of the ring circuit are indicated by the numerals 0–9. Each stage consists of a pair of electron tubes such as 11 and 12 in Figure 1. This is indicated in Figure 2 by the two small circles positioned radially with respect to the numeral with which they are associated. The connections between the ten stages of the ring circuit are not shown. In other words this is not an electrical diagram but a schematic diagram intended to show the juxtaposition and arrangement of the ten stages of the ring counter. It will of course be understood that the ring may include any number of stages other than ten, although decade rings are the most practical. For the purpose of explaining the invention the decade ring is illustrated. Nine of the inner tubes represented by the nine inner circles contain an X. This indicates that these nine tubes are in a more conducting state than their corresponding outer tubes. However, in stage No. 9 the outer tube is in a more conducting state than the inner tube. The ring circuit in Figure 2 therefore indicates the count of No. 9. The next positive pulse from the input impressed on conductors 51 and 52 will be applied to the grids of all tubes and will cause the count to advance from stage 9 to stage 0. The manner in which this will be accomplished will be described hereinafter. A negative pulse impressed on conductors 51 and 52, and consequently on the grids of all the tubes, will cause the count to move from 9 to 8 by making the inner tube of stage 9 conductive and the inner tube of stage 8 non-conductive or less conductive. It will be noted that only one tube of each stage can be in the conductive state, as is characteristic of an Eccles-Jordan circuit, and that only one stage is in a different state of equilibrium from all the other stages. This state of equilibrium can be rotated clockwise or counterclockwise by positive and negative pulses so that the ring circuit itself can assume ten different states of equilibrium, corresponding to the ten positions of the outer conducting tube.

The operation of this circuit is as follows: Let it be assumed that the decade ring is registering a count of zero and that therefore tube 12 is registering a count of zero and that therefore tube 12 is in a more conductive state than tube 11. All other right hand tubes such as tube 32 will therefore be in a less conductive state than their mates, for example tube 31. The current through resistor 16 in the cathode circuit of tube 12 will raise the potential of the grid of tube 32. Since the anode of tube 32 is also at a high potential because this tube is non-conductive, tube 32 is conditioned for becoming conductive in response to a positive pulse from the source of input pulses. In other words the positive pulses will advance the count from stage 0 to stage 1. It will also be evident that tubes 11 and 32 are the only tubes that have a high grid and high plate potential and are therefore in condition to respond to a positive pulse. When tube 32 becomes conductive its plate potential drops and lowers the grid potential of tube 31 and reduces the conductivity or cuts off the current in tube 31. Similarly tube 11 becomes conductive and cuts off tube 12. Thus stage 1 acquires the condition in which stage 0 was formerly.

Now assuming that stage 1 is in the condition representing a count, tube 32 will be more conductive than tube 31 whereas in all other stages left hand tubes, such as tube 11, will be more conductive than the right hand tubes, such as tube 12. Then tubes 11 and 32 are the only conductive tubes whose grids are connected to the cathodes of non-conductive tubes. Therefore the grids and anodes of tubes 11 and 32 are at low potentials. If a negative pulse is impressed on the ring circuit, tubes 11 and 32 will respond thereto and become non-conductive. The plate potentials of these two tubes will then rise, raising the grid potentials of tubes 12 and 31 and making these two tubes conductive. In this manner a negative pulse will transfer the count from stage 1 to stage 0. It will be evident that this process will occur successively between each stage and its adjacent stages, so that the count would be additive, or positive, for a positive pulse and negative or subtractive for a negative pulse.

The count may be indicated by placing small neon tubes 26, 46, etc., in some part of the circuit such as across the plate resistors 14, 34, etc., of each right hand tube circuit.

In a specific embodiment of our invention the circuit components had the following values:

| Resistors: | Ohms |
|---|---|
| **13, 14** | 100,000 |
| **15, 16, 27** | 22,000 |
| **19, 20** | 250,000 |
| **21, 22, 25** | 47,000 |
| **Condensers:** | Mfd. |
| **23, 24** | .001 |
| **17, 18** | 5 |

Tubes 11 and 12 were actually a single twin triode type 6SN7 tube. The circuit components and values are the same for all ten stages of the ring circuit. The values given above are not at all critical and very different values may be used equally as well.

To start the counter properly the No. 0 stage may be provided with a switch 29 to ground the grid of the right hand tube. All other stages may be provided with a switch similar to switch 49 in stage No. 1 to ground the grid of the left hand tubes. Before switching the counter on, these switches may be set to their grid grounding position. This will cause the counter to assume the zero count position. Alternatively, the counter may be set by switching it on and then grounding the grid of any stage that is in the wrong condition for the zero count. Other methods of establishing the zero count condition will be apparent to those skilled in the art.

The details of the coupling circuit 6, Figure 2, for connecting one differential decade circuit to the next decade circuit is shown in Figure 3. The coupling circuit 6 is substantially like the circuit shown in Figure 1 of application Serial No. 762,835, filed by Larry L. Young July 23, 1947, for Differential Detection and Counting of Traveling Pulses. Referring to Figure 3, there are shown a pair of electron tubes 61 and 62 having their grids connected to the terminals A and B. Also between these terminals are connected a pair of resistors 63 and 64 having their junction connected to a source of grid bias voltage C—, which maintains these tubes biased beyond cutoff. The cathodes of these tubes are grounded.

Tubes 65 and 66 have their anodes connected to the anodes of tubes 61 and 62 and their cathodes grounded through resistor 60. The grid of tube 65 is connected to the anode of tube 66 through resistor 68, and the grid of tube 66 is connected to the anode of tube 65 through resistor 67. If desired, resistors 67 and 68 may be shunted by small condensers to make the sides of the output pulses of tubes 65 and 66 steeper. Resistors 69 and 70 are connected to the grids of these tubes and have their junction grounded. The anodes of these tubes are connected through resistors 71 and 72 to a source of positive potential B+. The output pulses of tubes 65 and 66 are developed across the resistors 71 and 72 and impressed on the grids of tubes 75 and 76 through condensers 73 and 74. Tubes 75 and 76 are biased beyond cutoff by a biased voltage C— impressed on the grids of tubes 75 and 76 through resistors 77 and 78. The anodes of tubes 75 and 76 are connected to the source of B+ voltage through resistors 81 and 82. The output of tubes 75 and 76 may be taken from the anodes if negative pulses are required for the following decade circuit, or from the cathode if positive pulses are required. Suitable coupling condensers 83, 84 and 85 and cathode load resistors 79 and 80 are provided. The resistor 86 connected to the cathode of tube 76 prevents tube 75 from impressing excessive potentials on the cathode of tube 76.

Figure 4:
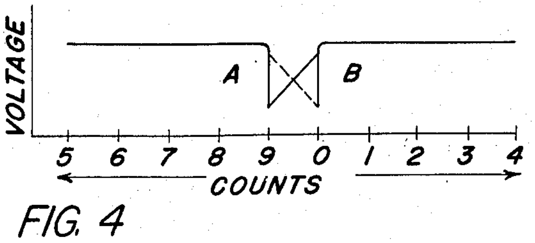
Figure 4 is a diagram showing the voltages at the terminals A and B in Figure 1.

The operation of the coupling circuit of Figure 3 will now be described. During a cycle of counts of the first decade circuit the voltage on terminal A will be as shown by the solid line A in Figure 4. The solid line represents the voltage at terminal B. The solid and dashed lines coincide for all counts except 9 and 0. At 9 a positive potential is impressed on terminal B, while at zero a negative potential is impressed on terminal A. When the count in decade circuit 1 moves from 9 to 0 tube 65 is triggered into its conducting stage, while tube 66 becomes non-conductive. This impresses a positive pulse on the grid of tube 76, which transmits a positive pulse through condenser 84 to the second decade circuit 10. A count from 0 to 9 impresses a negative pulse on decade circuit 10 through condenser 85, or a positive pulse through condenser 83 to decade circuit 100 in Figure 5.

Figure 5 shows another type of differential ring circuit. This circuit has been described in the Review of Scientific Instruments, October 1946, pages 375, 376. For simplicity, only so much of the decade circuits 90 and 100 are shown here as is required to show the method of coupling successive decade circuits. Here the tubes numbered 0 to 9 are the inner ring of pentodes (see the above cited publication) of which five are always conducting as indicated by the crosses. Between the anodes of tubes 5 and 0 are connected resistors 91, 92 and 93. The decade coupling circuit 6, the circuit of which is shown in Figure 3, is connected across resistor 93. If desired, suitable coupling condensers may be connected in series with resistors 91 and 92. A count from 9 to 0 in decade circuit 90 produces a positive count in decade circuit 100 by impressing a positive pulse through condenser 84, while a count from 0 to 9 produces a positive pulse through condenser 83 and causes a negative count in the second decade circuit 100. All four input conductors 101, 102, 103 and 104 are connected to a grid biasing source C−, suitable load resistors 94 and 95 being provided. It will be apparent from the above description that we have applied our coupling circuit to the decade circuits described in the Review of Scientific Instruments article to create a multiple decade differential counter.

Many variations, modifications, and other applications of our circuits will be apparent to those skilled in this art. The scope of our invention is limited only by the prior art and the following claims.

We claim:

1. A reversible counting circuit comprising, a succession of first vacuum tubes each having an anode, a cathode and a control means, a source of positive anode voltage, a separate resistance load connected between said source of positive anode voltage and each of said anodes, a separate cathode load connected between each of said cathodes and ground, means connecting the control means of each of said succession of first vacuum tubes to the cathode of the next succeeding first vacuum tube, a succession of second vacuum tubes each having an anode, a cathode and a control means, a separate resistance load connected between said source of positive anode voltage and each of said anodes of said second vacuum tubes, a separate cathode load resistance connected between the cathode of each of said second vacuum tubes and ground, means connecting the cathode of each of said succession of second vacuum tubes to the control means of the next succeeding second vacuum tube, means for cross connecting the anodes and control means of said first and second vacuum tubes in successive pairs to provide a succession of flip-flop circuits, and means for applying positive and negative pulses selectively to all said control means simultaneously in parallel.

2. A reversible counting circuit comprising a plurality of pairs of first and second vacuum tubes each having a control electrode, said pairs arranged in sequence and having sequential numerical significance, means for maintaining one only of said first vacuum tubes in conductive condition, means for maintaining one only of said second vacuum tubes in non-conductive condition, means for maintaining the first and second vacuum tubes of each of said pairs of first and second vacuum tubes selectively one in conductive and the other in non-conductive condition, and means for applying positive and negative pulses selectively in parallel to all said control electrodes simultaneously.

3. A reversible counting circuit comprising a plurality of pairs of first and second control devices each having a signal input element, said pairs arranged in sequence and having sequential numerical significance, means for maintaining one only of said first devices in conductive condition, means for maintaining one only of said second devices in non-conductive condition, means for maintaining the first and second devices of each of said pairs of first and second devices selectively one in conductive and the other in non-conductive condition, and means for applying positive and negative pulses selectively in parallel to all said signal input elements simultaneously.

4. A reversible counting circuit comprising a plurality of pairs of first and second vacuum tubes, means connecting each pair of said plurality of pairs of first and second vacuum tubes in flip-flop relation to maintain one only of said first and second vacuum tbues of said each pair in more conductive condition and the other vacuum tube of said each pair in less conductive condition and to render the more conductive one of said each pair less conductive in response to a negative pulse and the less conductive one of said each pair more conductive in response to a positive pulse, means for maintaining one only of said first vacuum tubes in said more conductive condition, means for maintaining one only of said second vacuum tubes in said less conductive condition, and means for applying positive and negative pulses selectively to all said vacuum tubes simultaneously in parallel.

5. A reversible counting circuit comprising a plurality of pairs of first and second control devices, means connecting each pair of said plurality of pairs of first and second devices in flip-flop relation to maintain one only of said first and second devices of said each pair in more conductive condition and the other device of said each pair in less conductive condition and to render the more conductive one of said each pair less conductive in response to a negative pulse and the less conductive one of said each pair more conductive in response to a positive pulse, means for maintaining one only of said first devices in said more conductive condition, means for maintaining one only of said second devices in said less conductive condition, and means for applying positive and negative pulses selectively to all said devices simultaneously in parallel.

6. A reversible ring counting circuit, comprising, a plurality of $n+1$ first vacuum tubes having each an anode, cathode and control electrode, said vacuum tubes having numerical significances $0 \ldots n$ in sequence, a plurality of $n+1$ second vacuum tubes having each an anode, cathode and control means, said vacuum tubes having numerical significances $0 \ldots n$ in sequence, $n$ being any integer, means interconnecting said first and second vacuum tubes in pairs in flip-flop interconnection, the first and second vacuum tubes of each of said pairs being of identical numerical significance, means for interconnecting the control means of each first vacuum tube to the cathode of the first vacuum tube having next higher numerical significance and the control means of the first vacuum tube having significance $n$ to the cathode of the first vacuum tube having numerical significance zero, means for interconnecting the cathode of each second vacuum tube to the control means of the second vacuum tube having next higher significance and the cathode of the second vacuum tube having significance $n$ to the control means of the second vacuum tube having significance zero, a separate cathode resistor load for each of said first and second vacuum tubes, and means for applying positive and negative pulses selectively to all said control means in parallel simultaneously.

7. A reversible counting circuit comprising, a plurality of successively ordered pairs of first and second vacuum tubes, each of said vacuum tubes comprising an anode, a cathode and a grid means, a separate anode resistor and a separate cathode resistor connected in series with each of said vacuum tubes, an interconnection between the anode of each pair of said vacuum tubes and the grid means of the other of said pair of vacuum tubes, means connecting the grid means of each of said first vacuum tubes to the cathode of the immediately succeeding vacuum tube, means connecting the cathode of each of said second vacuum tubes to the grid means of the immediately succeeding vacuum tube, and means for applying positive and negative pulses selectively to all said grid means simultaneously in parallel.

8. In a reversible counter ring, $n$ electronic conduction devices, $n$ being an integer greater than 2, each of said devices comprising elements conditionable to a first and a second condition selectively, and the condition of the ($n-a$)th element in said first condition indicating a count of $n-a$, $a$ being an integer less than $n$, means interconnecting said devices in a ring, means for maintaining only one of said devices in said first condition and the remainder of said devices in said second condition, means for applying selectively positive and negative pulses to all of said electronic conduction devices of said counter ring simultaneously in parallel, means for modifying the condition of said ($n-a+1$)th device to said first condition in response to a positive pulse and said ($n-a-1$)th device to said first condition in response to a negative pulse.

9. The combination in accordance with claim 8 wherein each of said devices comprises a pair of electronic devices and means for interconnecting said pair of electronic devices selectively to maintain one of said devices in less conductive condition and the other of said devices in more conductive condition.

10. The combination in accordance with claim 8 wherein each of said devices is a bi-stable pair.

11. The combination in accordance with claim 8 wherein each of said devices comprises a pair of elements interconnected in bi-stable relation.

12. In a reversible counter, $n$ devices, $n$ being an integer greater than 2, each of said devices comprising elements conditionable to a first and a second condition selectively, and the condition of the ($n-a$)th element in said first condition indicating a count of $n-a$, $a$ being an integer less than $n$, means interconnecting said devices in a chain, means for maintaining only one of said devices in said first condition and the remainder of said devices in said second condition, means for applying selectively positive and negative pulses to said elements of said counter simultaneously in parallel, means for modifying the condition of said ($n-a+1$)th device to said first condition in response to a positive pulse and said ($n-a-1$)th device to said first condition in response to a negative pulse.

13. The combination in accordance with claim 12 wherein each of said devices is a bi-stable pair.

14. The combination in accordance with claim 12 wherein each of said devices comprises a pair of elements interconnected in bi-stable relation.

15. In a reversible counter, $n$ devices, $n$ being an integer greater than 2, each of said devices comprising elements conditionable to a first and a second condition selectively, and the condition of the ($n-a$)th element in said first condition indicating a count of $n-a$, $a$ being an integer less than $n$, means interconnecting said devices in a chain, means for maintaining at least one of said devices in said first condition and the remainder of said devices in said second condition, means for applying selectively positive and negative pulses to said elements of said counter simultaneously in parallel, means for modifying the condition of said ($n-a+1$)th device to said first condition in response to a positive pulse and said ($n-a-1$)th device to said first condition in response to a negative pulse.

16. The combination in accordance with claim 15 wherein each of said devices is a bi-stable pair.

17. The combination in accordance with claim 15 wherein each of said devices comprises a pair of elements interconnected in bi-stable relation.

18. A reversible counting circuit comprising a first vacuum tube having an anode, a cathode and control electrode means, a second vacuum tube having an anode, cathode and control electrode means, a third vacuum tube having an anode, cathode and control electrode means, a fourth vacuum tube having an anode, cathode and control electrode means, means for connecting said control electrode means of said first tube to said anode of said second tube and to said cathode of said third tube, means for connecting said control electrode means of said second tube to said anode of said first tube and to said cathode of said fourth tube, a source of input pulses selectively of positive and negative polarity, means coupling said source of input pulses to said control electrode means of said first, second, third and fourth tubes, and separate cathode load for each of said vacuum tubes, and a separate anode load for each of said tubes.

19. A reversible counting circuit comprising a first vacuum tube having an anode, a cathode and control electrode means, a second vacuum tube having an anode, cathode and control electrode means, a third vacuum tube having an anode, cathode and control electrode means, a fourth vacuum tube having an anode, cathode and control electrode means, means connecting said anode of said third tube to said control electrode means of said fourth tube, means connecting said anode of said fourth tube to said control electrode means of said third tube, a source of input pulses selectively of positive and negative polarity, means coupling said source of input pulses to said control electrode means of said first, second, third and fourth tubes, a separate cathode load for each of said vacuum tubes, and a separate anode load for each of said vacuum tubes.

20. In a reversible counter ring, $n$ electronic conduction devices, $n$ being an integer greater than 2, each of said devices conditionable to a first and a second condition selectively, and the condition of the ($n-a$)th device in said first condition indicating a count of ($n-a$), $a$ being an integer less than $n$, means interconnecting said devices in a ring, means for maintaining only one of said devices in said first condition and the remainder of said devices in said second condition, an input terminal for said ring, means for applying at random to said input terminal positive and negative pulses, and means for modifying the condition of the ($n-a+1$)th device to said first condition in response to a positive pulse applied to said terminal and the ($n-a-1$)th device to said first condition in response to a negative pulse applied to said terminal.

References Cited in the file of this patent

UNITED STATES PATENTS

| | | |
|---|---|---|
| 2,384,379 | Ingram | Sept. 4, 1945 |
| 2,462,275 | Morton | Feb. 22, 1949 |
| 2,472,507 | Andresen et al. | June 7, 1949 |
| 2,534,287 | Marsh | Dec. 19, 1950 |

OTHER REFERENCES

Rev. Sci. Instr., October 1946, pp. 375–376, volume 17, No. 10, "Rev. Decade Counting Circuit."